United States Patent [19]

Melonio et al.

[11] 4,321,105
[45] Mar. 23, 1982

[54] METHOD OF PRODUCING EMBOSSED DESIGNS ON SURFACES

[75] Inventors: Christ H. Melonio, Youngstown; Gilbert P. Layfield, Warren, both of Ohio

[73] Assignee: Standex International Corporation, Salem, N.H.

[21] Appl. No.: 115,402

[22] Filed: Jan. 25, 1980

Related U.S. Application Data

[63] Continuation of Ser. No. 921,765, Jul. 3, 1978, abandoned, which is a continuation-in-part of Ser. No. 832,092, Sep. 12, 1977, abandoned.

[51] Int. Cl.³ .............................................. C23F 1/02
[52] U.S. Cl. ..................... 156/660; 156/905; 430/310; 430/329
[58] Field of Search ............... 430/305, 306, 307, 310, 430/323, 329; 156/658, 659.1, 660, 661.1, 905, 230, 240, 247, 249; 101/34

[56] References Cited

U.S. PATENT DOCUMENTS

| | | | |
|---|---|---|---|
| 3,052,581 | 9/1962 | Gutknecht | 156/660 |
| 3,188,211 | 6/1965 | Kocsuta | 430/307 X |
| 3,469,982 | 9/1969 | Celeste | 430/313 X |
| 3,884,693 | 5/1975 | Bauer et al. | 430/307 X |

FOREIGN PATENT DOCUMENTS 24303 12/1896 United Kingdom ................. 156/660

*Primary Examiner*—William A. Powell
*Attorney, Agent, or Firm*—Lawrence A. Maxham

[57] ABSTRACT

A method for producing embossed designs on work surfaces such as on molds, rolls or dies. A photomechanically imageable transfer material is exposed to the design to be embossed. The material is developed and the acid resistant design material remaining on a backing sheet is mechanically transferred to the work surface by burnishing the back of the backing sheet. The surface is then etched and the acid resistant design elements removed so that the embossed work surface is ready for use.

14 Claims, 13 Drawing Figures

METHOD OF PRODUCING EMBOSSED DESIGNS ON SURFACES

CROSS REFERENCE TO RELATED APPLICATION

This is a continuation of application Ser. No. 921,765 filed July 3, 1978, now abandoned, which was a continuation-in-part of application Ser. No. 832,092 filed Sept. 12, 1977, now abandoned.

FIELD OF THE INVENTION

This invention relates generally to the formation of designs on work surfaces and more particularly concerns a novel simplified process for forming the desired designs on surfaces of molds, rolls and dies used in the formation of articles generally made of deformable materials.

DISCUSSION OF THE PRIOR ART

The prior art is well represented by U.S. Pat. No. 3,052,581. The normal practice is to reproduce the desired design on a flat metal plate, usually made of zinc, by photo engraving. An adherent waxy bituminous acid resistant substance is then spread over the surface of the plate to fill the design areas which have been etched out of the surface. The design is removed from that surface by means of tissue paper which has been brought in firm surface contact with the adherent waxy material. This tissue paper is then used as a means of transferring the design from the flat plate to the mold surfaces. The tissue paper is moistened with a solution of alcohol and water acting as a release agent to facilitate its removal leaving the waxy material in place in the mold. After the mold is etched, the waxy material is removed by means of a solvent and the mold is then available to be employed for making plastic articles.

A particular disadvantage of this process is that the waxy acid resistant substance tends to be flowable if the pressure of application to the mold surface appreciably exceeds the necessary pressure. This presents a real limitation on the fineness of pattern elements which can be transferred accurately.

Processes for etching gravure printing cylinders and plates involve etching designs in metal surfaces. However, the considerations for such etching are substantially different from mold engraving. The former relates to what may be termed two-dimensional uses, depth of etch being necessary only to the extent of design delineation for printing purposes. Mold engraving, on the other hand, the subject of the present invention, relates to three-dimensional uses, that is, an actual surface texture in an article made with the engraved mold. Steps to provide a surface etch are in many instances unsatisfactory for making a deeper etch for surface texturing.

SUMMARY OF THE INVENTION

It is an object of this invention to provide a simplified method for producing embossed designs on work surfaces such as on molds rolls and dies. For purposes of simplification the term "mold" will generally be used herein. This novel process requires fewer steps and fewer materials than the prior art method and thereby reduces both the time and cost necessary to enboss the surfaces of mold cavities. Not only is the present process simpler and quicker, it allows finer designs to be produced in a more positive manner than the prior art processes.

A master negative of the pattern to be reproduced is prepared and this pattern is exposed to a photomechanically imageable transfer material. Upon development, the hardened image areas are acid resistant and are then transferred by means of the backing sheet on which the image is formed, to the mold surfaces. This backing sheet is rubbed or burnished with a blunt stylus to transfer the image areas to the mold surface which has normally been appropriately prepared prior to application of the elements of the acid resistant image. The mold surface is then etched, the image elements removed and the mold is then ready to be employed for making plastic articles. The term "plastic" is to be broadly interpreted herein to include any deformable materials including rubber, metals which are surface textured by dies, and metals, fabric or paper which are textured or embossed by means of rolls.

BRIEF DESCRIPTION OF THE DRAWING

The objects, advantages and features of this invention will become readily apparent from the following detailed description when read in conjunction with the accompanying drawing in which.

DESCRIPTION OF THE PREFERRED EMBODIMENT

Figure 1:
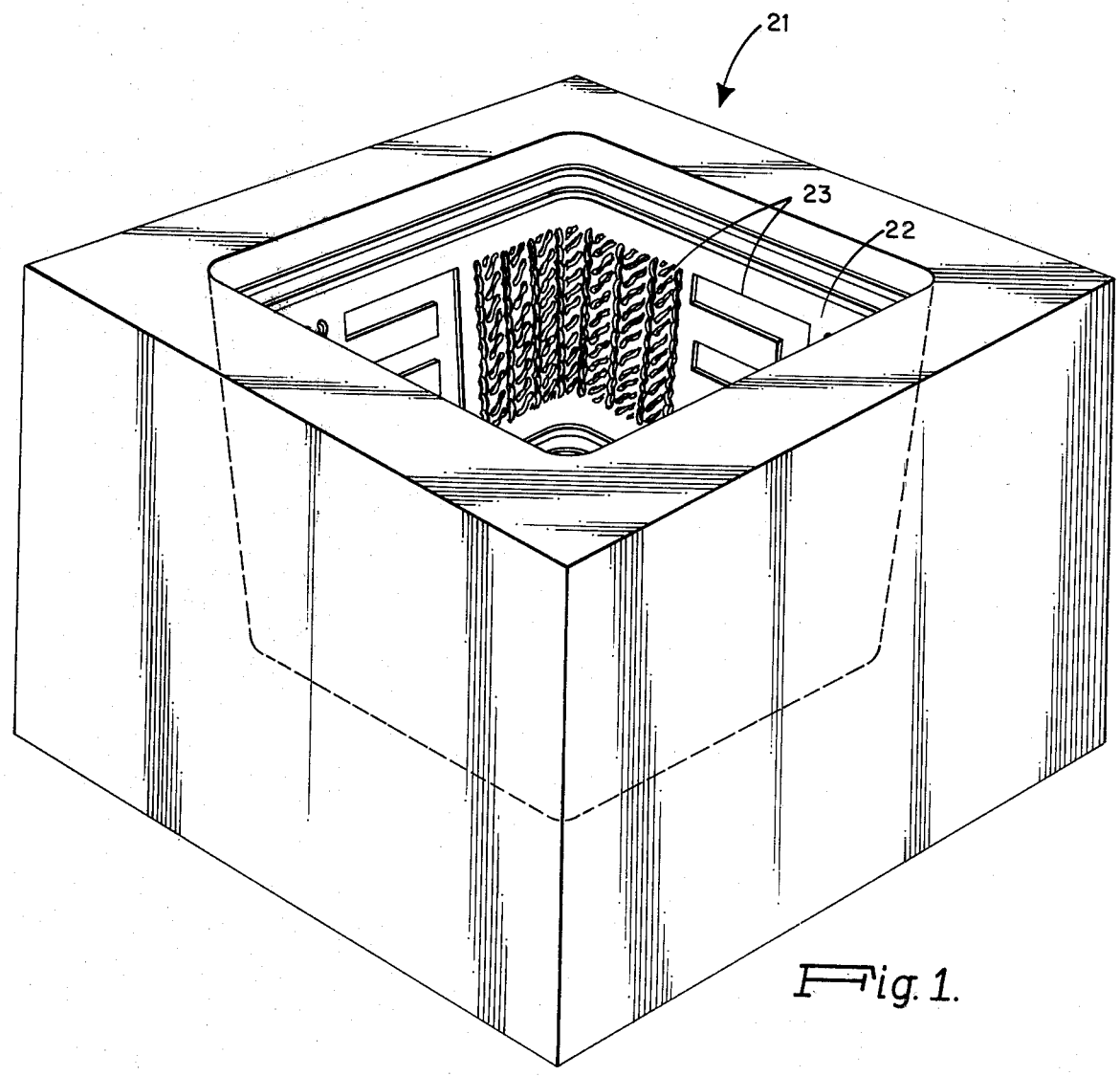
FIG. 1 is a perspective view of a mold cavity having a pattern formed on its surfaces by means of the present invention.

With reference now to the drawing and more particularly to FIG. 1 thereof, there is shown a mold cavity 21 having internal wall surfaces 22 with decorative patterns 23 embossed therein. For purposes of this description, a relatively simple pattern having the letter "E" flanked by decorative areas is shown. Of course, very intricate surface textures, patterns or designs may be used. It will be understood by those skilled in the art that any design capable of being photographically or otherwise reproduced may be formed as a design in relief on the inner surface of the cavity of a mold so that articles formed in the cavity will have the design embossed therein as an integral part of their outer surface.

Figure 2:
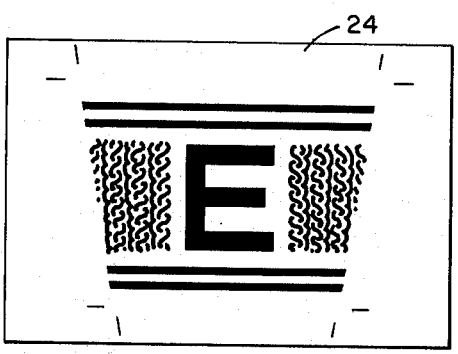
FIG. 2 is the original copy of the design to be embossed onto the mold surfaces.
Figure 3:
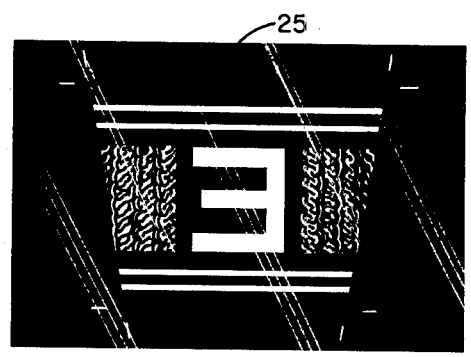
FIG. 3 shows the negative made from the original copy of FIG. 2.
Figure 4:
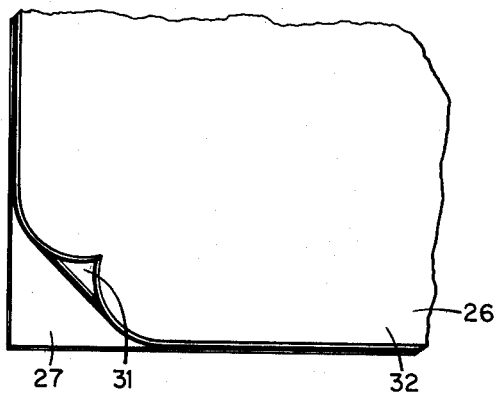
FIG. 4 is a fragmentary view with partial separation showing the transfer material used for the invention.
Figure 6:
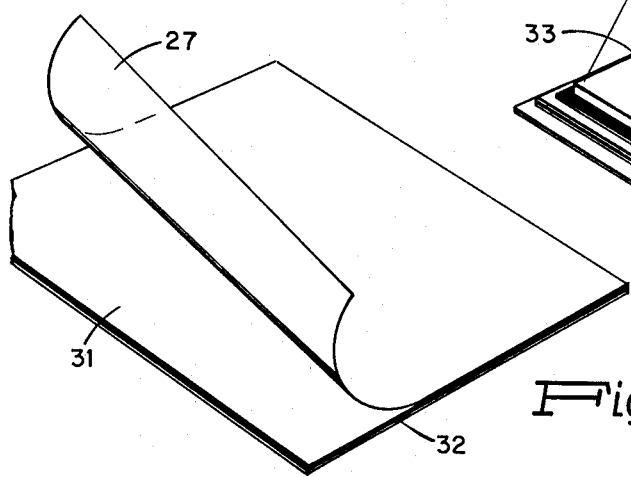
FIG. 6 shows the clear protective film being removed from exposed emulsion.
Figure 5:
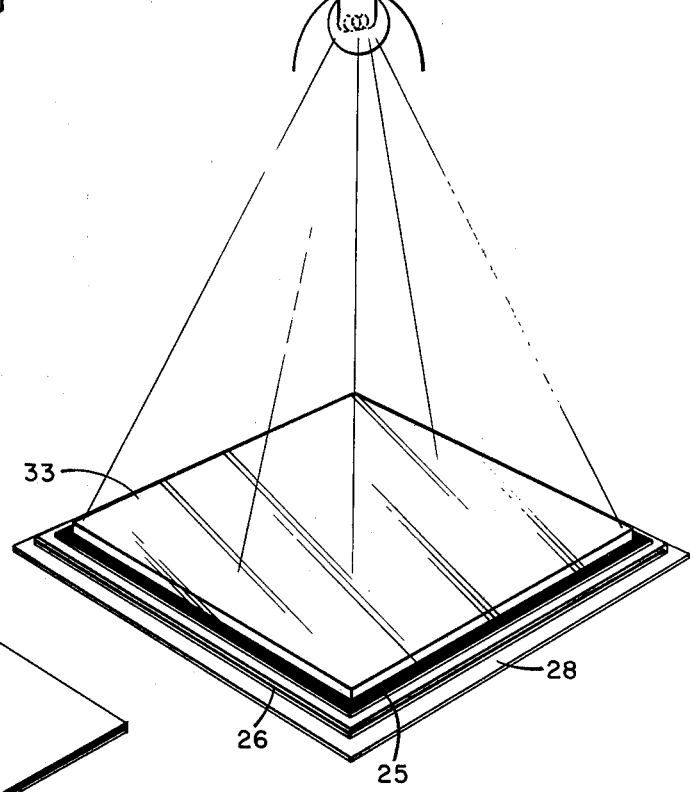
FIG. 5 is a perspective view of the arrangement for exposing the transfer material to the design.
Figure 7:
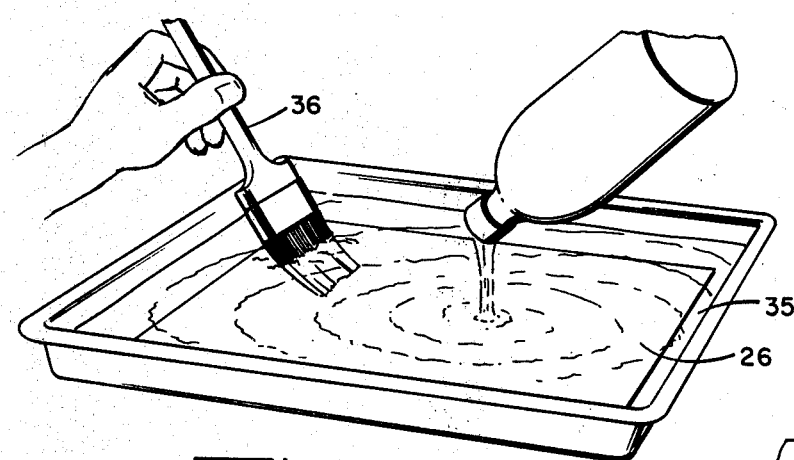
FIG. 7 is a perspective view of the developing step.
Figure 8:
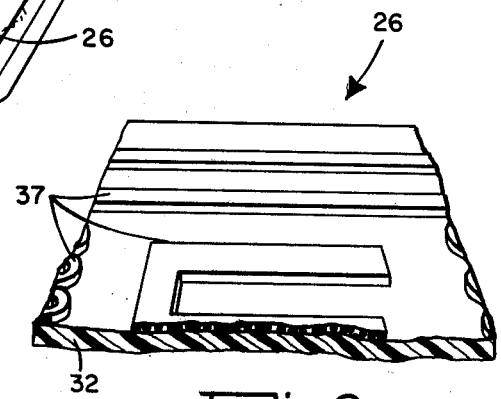
FIG. 8 is an enlarged fragmentary perspective view of the polyester backing sheet with the acid resistant design elements thereon.

The original copy 24 (FIG. 2) from which the master film negative 25 (FIG. 3) is to be made is normally black and white art work. The copy may be of any desired size and will often be larger than the actual embossed design so that it can be reduced photographically and still retain desired fine line quality. The master film negative is made from the original art work by conventional photographic procedures. The film is shown herein as a negative but a positive transparency may be used if desired. Photomechanically imageable transfer material 26 shown in FIG. 4 is then exposed as shown in FIG. 5. An opaque masking paper 28 provides the support for the transfer material 26 which is comprised of a clear protective liner 27, emulsion layer 31 and polyester backing 32, with the clear liner in confronting relationship with the masking paper. On top of transfer material 26 is master negative 25 and on top of that is glass plate 33. A conventional light source 34 provides the radiation for exposing the emulsion in the transfer material to the pattern of negative 25. Examples of light sources will be set forth hereinbelow. When exposure is complete, the clear liner 27 is peeled away from the exposed emulsion as shown in FIG. 6, leaving the exposed emulsion 31 on polyester backing sheet 32. Liquid developer 35 is then poured onto the exposed transfer material and an appropriate tool such as a pad or a brush 36 is used to spread the developer evenly over the exposed surface to facilitate development of the emulsion as indicated in FIG. 7. When the image is fully visible, the transfer material is rinsed with water and dried. At this point (see FIG. 8), the transfer material 26 comprises polyester backing sheet 32 and acid resistant transferable material 37 in discrete areas in the form of the pattern desired. The material 37 thus formed has the proper degree of tackiness to enable it to adhere to the mold surface without being so soft as to flow when subject to pressure during application to the mold.

Figure 9:
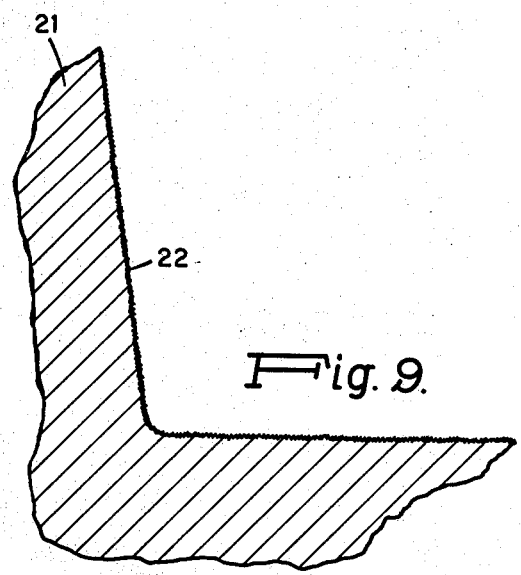
FIG. 9 is a fragmentary sectional view of a portion of a mold showing the minutely roughened surface thereof.
Figure 10:
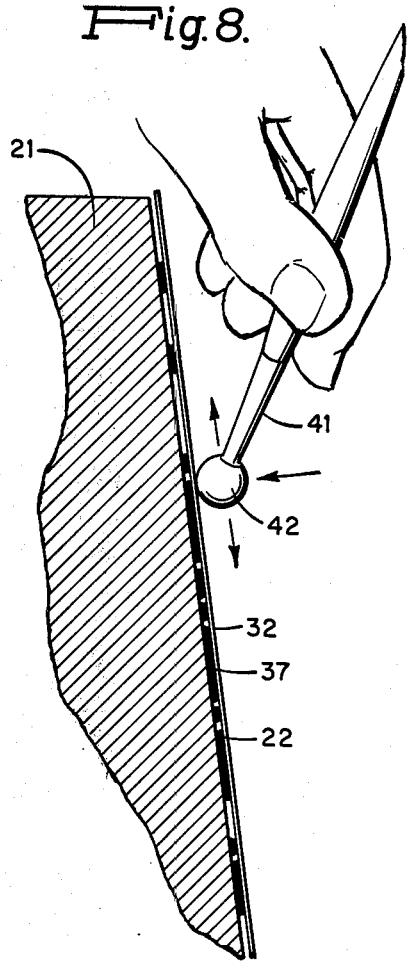
FIG. 10 is a fragmentary sectional view of a mold surface on an enlarged scale showing the backing sheet and design elements against the mold surface together with the burnishing step for transferring the design elements from the backing sheet to the mold surface.
Figure 11:
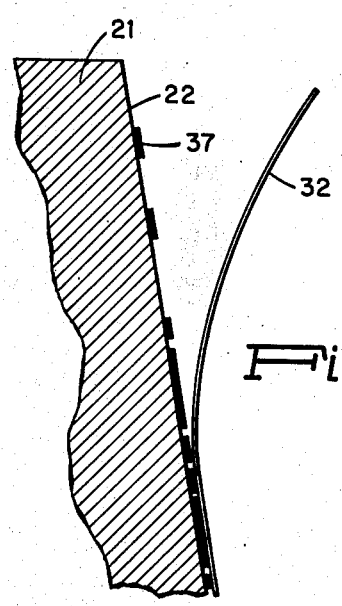
FIG. 11 shows the backing sheet being removed from the transferred design elements.

A fragmentary sectional view of a portion of a mold cavity is shown in FIG. 9. Inner surface 22 of mold 21 has an overall "tooth" or minutely roughened surface which may be formed by subjecting the surface to a mold acid bath so as to etch the surface and condition it for reception of the acid resistant transfer material. Other suitable means for roughening the surface may be used, including both mechanical and chemical means. However, it has been found that this process will work well on roughened or on polished surfaces and all intermediate surface textures. The backing sheet and transfer material elements are applied to the surface of the mold as shown in FIG. 10 so that the transfer material 37 makes intimate contact with surface 22. The transfer material is actually transferred from the backing sheet to the mold surface by burnishing as shown. Stylus 41 has a smooth, blunt end 42 which enables the operator to provide a relatively large pressure to a relatively small area to thereby transfer the acid resistant material, which is hard to the touch but adherent to the mold surface when burnished, from the backing sheet. Other stylus shapes may be used, but it will generally be a blunt ended instrument. As the burnishing step progresses, the image will take on a gray appearance through sheet 32 indicating that the transfer material elements are being separated from the sheet and transferred onto the surface of the mold. When transfer of the design elements has been accomplished, the backing sheet is simply removed, since it does not adhere to anything after transfer, as shown in FIG. 11, leaving the acid resistant transfer material 37 in the desired pattern on surface 22 of the mold. It has been found that when sufficient pressure has been applied to cause the acid resistant material 37 to adhere to the mold surface, it has separated from the backing sheet. The acid resistant material will adhere to one surface or the other.

Figure 12:
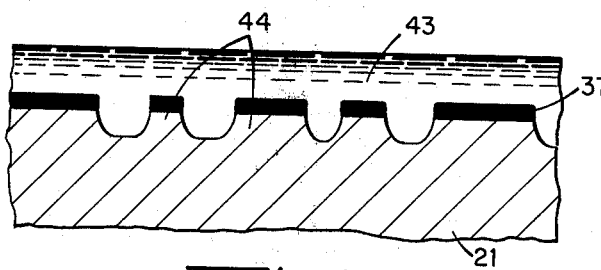
FIG. 12 is an enlarged fragmentary sectional view showing the mold surface at the end of the etching step.
Figure 13:
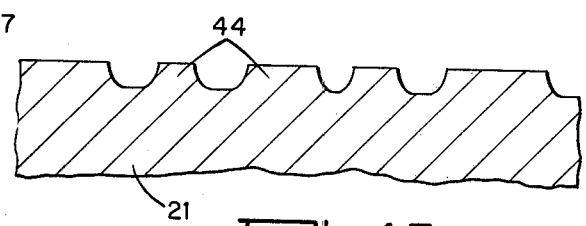
FIG. 13 shows the mold surface of FIG. 12 after removal of the acid resistant design elements.

An etching solution 43, normally acid based and having properties appropriate for the material of the mold, is applied to the mold surface for sufficient time to etch away the mold in areas not protected by the acid resistant transfer material 37, leaving raised areas 44 as shown in FIG. 12. When this has been accomplished the acid resistant material may be removed mechanically by an abrasive or by an abrasive in combination with a solution such as alcohol to weaken the bond with the mold surface, leaving the mold with the design embossed thereon as raised areas 44 in FIG. 13. A typical example of a completed mold is shown in FIG. 1.

It will be appreciated that the present invention eliminates several intermediate steps of the prior art, specifically etching of the zinc transfer plates, pulling of the wax tissue transfers therefrom, and application of a release agent to separate the tissue from the wax pattern applied to the mold surface. This invention proceeds directly from photographic exposure of the transfer material to the application of the design onto the surface of the mold. Not only is processing time significantly reduced but, more importantly, quality can be improved by eliminating some of the steps in the prior art processes, each of which may lead to loss of pattern definition. Further, by proceeding directly from the photographic step to application of the pattern to the mold surface, exceptionally fine detail can be included in the design which will faithfully be reproduced on the item made and surface textured within the mold cavity.

Another factor in being able to maintain the fine detail of the original art work in the finished mold is the exposure parameters. For example, over exposure, either in time or in light intensity, can result in the transfer material being too hard to properly adhere to the mold surface, that is, it will be lacking the necessary characteristic of tackiness. On the other hand, too little exposure, while sufficient to create pattern definition on the transfer material, may result in soft acid resistant pattern material 37 which does not readily separate from the backing sheet as a consequence of the burnishing step, and at the same time is flowable under burnishing pressure. This could effectively destroy fine pattern definition. Furthermore, under exposure may prevent proper development of the pattern material so that its acid resistant characteristic is inadequate, that is, even if it could be transferred to the mold surface, it would not function properly in masking the desired areas of that surface against acid etching. Thus, if the correct degree of tackiness is not achieved, the resist may fail during the etching step resulting in a damaged mold. Optimum tackiness for a large majority of applications, using an 11 inch by 14 inch film (27.94 by 35.56 mm) may be achieved by means of a light source consisting of four 60 watt, 120 volt, ultraviolet fluorescent tubes spaced from the transfer material by 1.5 inches (3.81 mm) for about 45 seconds. The exposure time may vary between 30 and 90 seconds in actual practice. A typical, suitable, commercially available exposure unit is 3M Model EU- 8000, which may be employed to achieve the desired exposure characteristics specified above. It should be recognized that the above exposure parameters are examples only and many combinations of light sources, distances and exposure times may produce useful results.

An example of the material suitable for use as the transfer material is a product sold under the name I.N.T. by 3M Company. A suitable developing solution for the material is the 3M Brand Image'N Transfer Developer. Tests have shown that the transfer material 37 is about 0.5 mil (0.0127 mm) thick and can withstand various etching formulations which are known for particular mold surface materials which etch to a depth appropriate for the particular pattern requirements and type of metal being etched. It will be readily appreciated by those skilled in the art that the depths of etch required for embossed or molded-in textured patterns are significantly greater than the depths required for gravure or lithographic printing surfaces so that the processing considerations are significantly different when preparing a mold for textured patterns. The typical depth of etch ranges between 0.003 inch (0.00762 mm) to 0.015 inch (0.0381 mm), depending upon type of pattern, product application, and aesthetic considerations, among others. However, heavier, coarser patterns may be etched to depths at least as great as 0.05 inch (0.127 mm). It may be said that etching involved in graphic techniques relates to two dimensional considerations while the textured molds of this invention are concerned with three dimensions.

The process of this invention may be used on all common mold-making materials, such as pre-hardened steel (an example being P20), hardened tool steels (such as S-7), aluminum (6061 for example), and beryllium copper, among others.

It should be recognized that the above materials and specifications are examples only and are not definitive of the present invention. In light of the above disclosure, it is likely that modifications and improvements will occur to those skilled in the art which are within the scope of this invention.

What is claimed is:

1. A method for engraving designs on complex curved work surfaces such as on molds or dies, said work surfaces being employed for producing embossed designs on the corresponding complex curved surfaces of products formed from deformable materials, said method comprising the steps of:
    preparing a master transparency from art work comprising the desired design;
    exposing transfer material to said design on said master transparency, said transfer material comprising an emulsion, the exposed portion of which is acid resistant upon exposure, said emulsion being on a backing sheet;
    removing unexposed areas of said emulsion to define discrete acid resistant image elements on said backing sheet;
    transferring said image elements from said backing sheet to said work surfaces;
    etching said work surfaces; and
    removing said image elements from said work surfaces.

2. The method recited in claim 1 wherein said transferring step comprises the intermediate steps of:
    placing said backing sheet on the work surfaces with said elements in intimate contact therewith;
    burnishing the surface of said backing sheet with a blunt instrument to thereby firmly engage the image elements with the work surface and remove said image elements from said backing sheet; and
    removing said backing sheet from said transferred image elements.

3. The method recited in claim 1 wherein:
    said transfer material comprises said emulsion sandwiched between a clear protective film and said backing sheet, said method comprising the further step of:
    removing said protective film from said exposed emulsion after said exposing step.

4. The method recited in claim 1 wherein said developing step comprises the further step of spreading developing solution evenly over said exposed emulsion.

5. The method recited in claim 1 wherein said etching step is accomplished with a solution appropriate for the material of the work surface.

6. The method recited in claim 1 wherein said removing step is accomplished mechanically by an abrasive.

7. The method recited in claim 6 wherein said removing step further employs a solution to soften said image elements.

8. The method recited in claim 1 wherein said method comprises the further step of preparing the work surfaces by roughening prior to said transferring step.

9. A method for engraving designs on complex curved work surfaces such as on molds or dies, said work surfaces being employed for producing embossed designs on the corresponding complex curved surfaces of products formed from deformable materials, said method comprising the steps of:
    preparing a master transparency from art work comprising the desired design;
    exposing transfer material to said design on said master transparency, said transfer material comprising an emulsion, the exposed portion of which is tacky and acid resistant upon exposure, said emulsion being on a backing sheet;
    removing unexposed areas of said emulsion to define discrete tacky and acid resistant image elements on said backing sheet;
    mechanically directly transferring said image elements from said backing sheet to said work surfaces;
    etching said work surfaces; and
    removing said image elements from said work surfaces.

10. The method recited in claim 9 wherein said transferring step comprises the intermediate steps of:
    placing said backing sheet on the work surfaces with said elements in intimate contact therewith;
    burnishing the surface of said backing sheet with a blunt instrument to thereby firmly engage the image elements with the work surface and remove said image elements from said backing sheet; and
    removing said backing sheet from said transferred image elements.

11. The method recited in either claim 9 or 10 wherein said exposing step exposes said transfer material so as to enable said developed acid resistant material to have sufficient tackiness to adhere to the work surfaces and having sufficient hardness to prevent flowing during said transferring step.

12. The method recited in either claim 9 or 10 wherein said exposing step exposes said transfer material so as to enable said developed acid resistant material to have sufficient tackiness to adhere to the work surfaces and being sufficiently hard so it separates from said backing sheet during said transferring step.

13. The method recited in any of claims 1, 2, 9 or 10 wherein said exposing step comprises:
   placing a plurality of ultraviolet fluorescent tubes approximately 3.8 mm from said transfer material;
   energizing said tubes; and
   maintaining said energized tubes at said position with respect to said transfer material for between 30 and 90 seconds.

14. The method recited in either claim 1 or 9 wherein said etching step continues until the depth of etch in the work surfaces reaches between 0.00762 mm and 0.127 mm.

* * * * *